United States Patent [19]

Sieb, Jr. et al.

[11] Patent Number: 4,618,990
[45] Date of Patent: Oct. 21, 1986

[54] EDGE ENHANCEMENT FILTERING FOR DIGITAL FLUOROGRAPHY IMAGES

[75] Inventors: Lawrence E. Sieb, Jr., Oconomowoc; David G. Mliner, New Berlin, both of Wis.

[73] Assignee: General Electric Company, Schenectady, N.Y.

[21] Appl. No.: 671,746

[22] Filed: Nov. 15, 1984

[51] Int. Cl.$^4$ .............................................. G06K 9/40
[52] U.S. Cl. ........................................ 382/43; 382/22
[58] Field of Search .......................... 382/43, 22, 6, 54

[56] References Cited

U.S. PATENT DOCUMENTS

| | | | |
|---|---|---|---|
| 4,449,195 | 5/1984 | Andrews et al. | 364/900 |
| 4,558,462 | 12/1985 | Horiba et al. | 382/43 |
| 4,573,197 | 2/1986 | Crimmins | 382/43 |

Primary Examiner—Stephen A. Kreitman
Attorney, Agent, or Firm—Fuller, House & Hohenfeldt

[57] ABSTRACT

For edge enhancement of a digitized fluorographic image, the original image is stored in a full frame memory. When each video vertical blanking pulse occurs time delays are initiated corresponding to shifting whole lines of pixels successively to the left and right and up and down by integral numbers before the pixels are read out of memory. As the pixels are read out for each vertical blanking cycle, they are multiplied by a coefficient related to the pixel shift number and the result is added to to image data from preceding cycles that are summed and stored in a second memory and the new result is returned to the second memory. The final result is an edge map in the second memory constituting digital values corresponding to the frequency components at edges. These are added to corresponding pixels in the original image, resulting in higher and sharper edges in a final digital image. The image is then converted to analog video signals to permit display on a video monitor.

1 Claim, 8 Drawing Figures

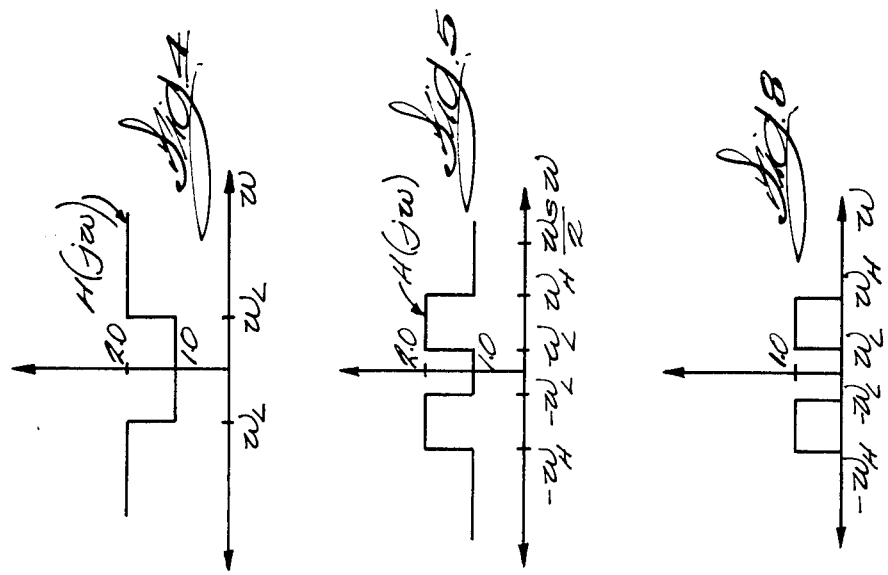
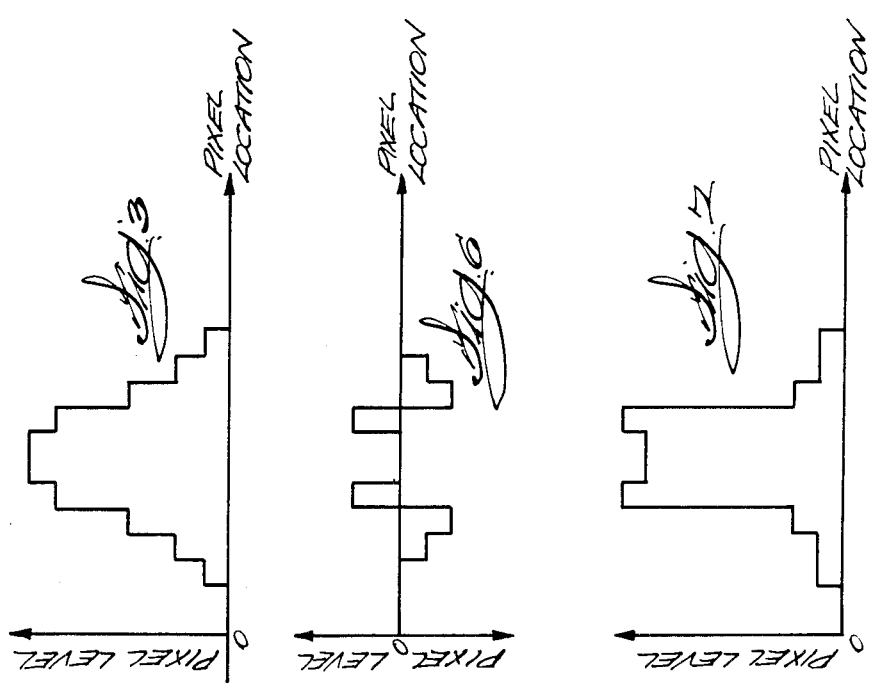

EDGE ENHANCEMENT FILTERING FOR DIGITAL FLUOROGRAPHY IMAGES

BACKGROUND OF THE INVENTION

This invention pertains to a method and apparatus for filtering digital data representative of a fluorographic image to obtain edge enhancement or increased sharpness without significant amplification of noise that is inherent in imaging systems.

Digital fluorography procedures are used extensively to permit visualizing the condition of blood vessels in the body. It is basic to digital fluorography to make at least one mask image of the region in the body where the blood vessel of interest resides. This mask image is made and stored before there is any X-ray contrast medium present in the blood vessel. After the contrast medium, which has been injected in the circulatory system, arrives in the region-of-interest another image is made and the mask image is subtracted from it by electronic means. Subtracting yields a difference image wherein everything that remains constant such as the bony structures, between the two images cancels out and anything that has changed, particularly the density of blood vessel due to the opaque medium remains. Thus, the configuration of the blood vessel can be visualized.

When images are simply subtracted there is usually less than optimal sharpness at edges such as where the blood vessel interfaces with surrounding tissue. Hence, it is common practice to resort to edge enhancement in order to provide the sharp or crisp appearing difference image of blood vessels diagnosticians prefer. An undesirable characteristic of prior art enhancement methods is that they enhance the noise that is inherent in the imaging system as well as the edges so the displayed image looks noisy.

It is beneficial to consider the reasons why there is a lack of sharpness in fluorographic X-ray images where transitions are made between adjacent areas that have different densities. In fluorographic systems the X-ray beam or ray bundle that is projected through the body emanates from a point on the X-ray tube target. The X-ray image emergent from the body impinges on the input phosphor of the photocathode of an electronic image intensifier. A ray or plurality of rays that define an edge are in themselves well defined and can be considered points, but they do not produce a corresponding point df light in the input phosphor. Rather, the point or points or incoming ray or rays, respectively, excite slightly larger areas in the input phosphor to fluoresce, thereby contributing to unsharpness. The intensifier converts the input image to a modulated electron beam image which impinges on the output phosphor to yield a bright, visible image. Here again discrete beams of electrons excite zones with intensity gradients on the output phosphor, further contributing to unsharpness.

The optical image on the output phosphor of the image intensifier is viewed with a video camera that converts the image to analog video signals, further spreading of the image points on the target of the camera.

A consequence of the various types of point spreading is that the edges in the fluorographic image are gradual intensity transitions whose representative electric signals do not contain many high frequency components. Thus, in effect, the imaging chain acts like a low pass filtering system.

In fluorographic systems an analog-to-digital converter (ADC) converts the analog video signals to digital signals whose values correspond to the intensities of the pixels that compose the image. The ADC adds broad spectrum noise or white noise. The electronics of the video camera and photonstatistics also add white noise to the signal.

In summary, the high frequency components of the image are attenuated by the image intensifier and video camera while noise, some at high frequencies, is added by the ADC and the video camera. Hence, the digitized image will be noisier than the original X-ray image and the edges of the blood vessel, when displayed on a video monitor will be more diffuse or unsharp or fuzzier. As previously indicated, prior art devices that are designed to enhance or sharpen the edges in images by filtering out the low frequency components in the image signal also amplify the noise undesirably.

SUMMARY OF THE INVENTION

The filter system described hereinafter sharpens or enhances edges in an image without amplifying noise that lies outside of the frequency range within which the valid image information is contained so that the signal-to-noise ratio, as well as sharpness, is improved.

The method involves putting a digitized image that is to undergo edge enhancement in a full frame memory and then defining frequency components that are to be enhanced to sharpen the edges. The definition of frequency components to be enhanced corresponds to the frequency responce of the edge enhance filter. The Fourics series coefficients of the filter function are determined. The filter is implemented by shifting the original image, multiplying by a filter coefficient and storing. The image is shifted again and multiplied by the next filter coefficient; then added to the previous result. This process continues until all the required shifts, multiplies and adds have been performed. The nature of the coefficients and shifts will vary as described herein.

How the filter method is performed will be described in reference to the drawings.

DESCRIPTION OF THE DRAWINGS

FIGS. 3–8 are plots that are useful for explaining various aspects of the image enhancement process.

DESCRIPTION OF A PREFERRED EMBODIMENT

Figure 1:
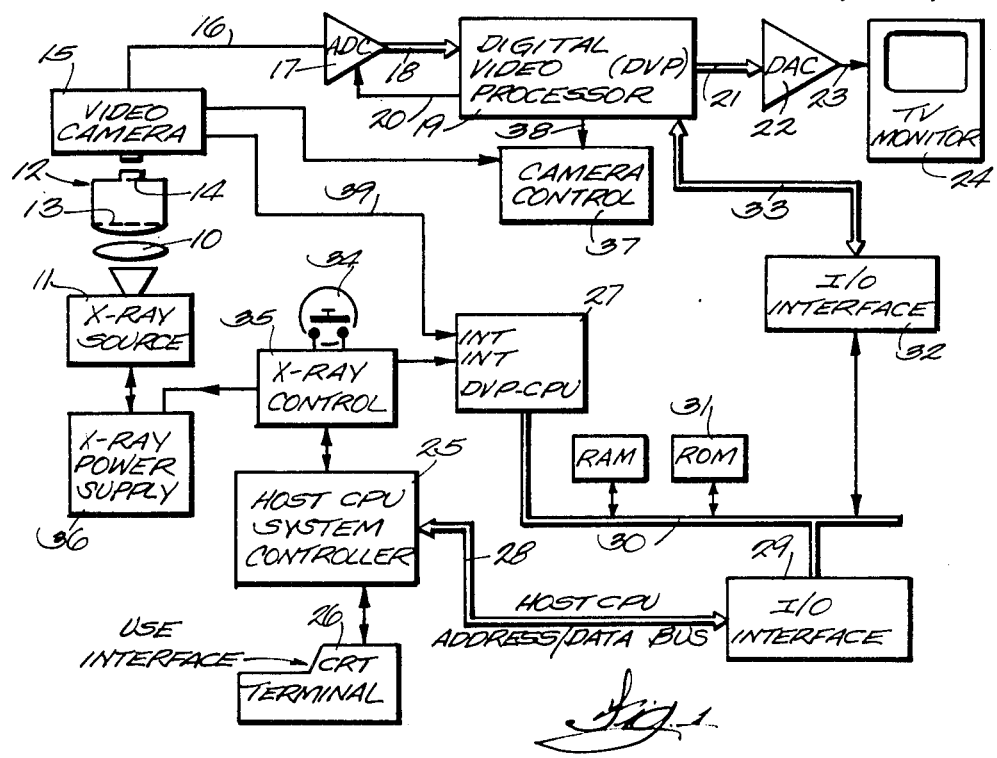
FIG. 1 is a generalized block diagram of a system for acquiring digitized fluorographic images and for enhancing edges therein.

The basic elements of a typical system for acquiring digital fluorographic images and for processing and filtering the images to enhance edges is depicted in the FIG. 1 block diagram. The body which is to undergo a fluorographic examination is represented by the ellipse marked 10. An X-ray source 11 is beneath the body. The source is controllable to project an X-ray beam through the body for producing an X-ray image. A well known type of image intensifier 12 is positioned above the body. The X-ray image emergent from the body impinges on the input phosphor 13 of the intensifier which converts the X-ray image to a light image and is part of a photocathode structure, not detailed, in the intensifier 12. As mentioned earlier, the input phosphor 13 is one element that reduces sharpness at the edges of the picture elements because any incoming ray bundle having a specific cross-sectional area corresponding to the area of a pixel will excite a larger area on the input phosphor 13 to fluoresce and overlap adjacent pixels.

The image intensifier 12 is operative to convert the light on input phosphor 13 to a modulated electron beam image which impinges on the output phosphor that is represented by the dashed line 14 where conversion to a bright optical image occurs. The output phosphor also causes elements corresponding to respective pixels to overlap adjacent pixels and thereby contribute to reducing sharpness.

The optical image on output phosphor 14 is viewed with a video camera 15 that converts the image to corresponding analog video signals. The analog video signals are output from the camera on line 16 and are input to an analog-to-digital converter (ADC) 17. ADC 17 is operative to convert the analog signal for each horizontal line to a series of digital signals whose values correspond to the intensities of the picture elements comprising the X-ray image. The horizontal lines of digital pixel data are fed by way of bus 18 to a digital video processor (DVP), represented by the block marked 19, where the lines forming an image frame can be stored in a memory. In the most advanced fluorographic systems the digital pixel data representing each image frame are stored in raw form on digital disk, not shown, so the original data can be accessed at any time by the DVP 19 for further processing.

DVP 19 also contains a clock pulse generator, not shown in FIG. 1, that provides a clock pulse train by way of line 20 to ADC 17. A typical pulse rate, and, hence, analog-to-digital pixel conversion rate or sampling frequency is about 12 MHz.

The target of video camera 15 also causes some overlapping of adjacent pixels as a result of spreading of the electron distribution beyond the true boundaries of any given pixel and there is further diffusion as a result of the electron scanning beam being wider than a theoretical point and these phenomena further contribute to unsharpness. Since the spread of the points or lines defining edges in the image results in slow changes in intensity where the change should be sharper, the electric signals representative of the image have mostly low frequency content. The anatomical information which is useful for diagnosis is represented by electric signals composed mainly of low frequency components. Because of the information points spreading as described above, any one digital pixel value in an image frame will not only contain signal due to the true dimensions of an edge bounded area but will also contain some signal from several digital pixel values above and below and to the right and left of the one pixel.

It is well known that in image acquisition systems, such as the one being discussed, entry of noise into the image representing signals is inevitable. The noise is generally flat in amplitude across a broad frequency spectrum extending below and above the signal frequency band wherein the useful information is contained. Prior art schemes for edge enhancement of fluorographic images have not obtained the desire image sharpness or crispness because they also enhance or amplify the higher frequency noise.

When image data is processed as desired in DVP 19 and is ready for display, the digital image data signal is fed from the DVP by way of a bus 21 to the input of a digital-to-analog converter (DAC) 22 and converted to analog video signals. The analog video signals are supplied, by way of a line 23 to a TV monitor on whose screen the image is displayed.

The new fluorographic image edge enhancement filtering scheme constituting the present invention could be carried out with electronic circuitry dedicated to that purpose but performing edge enhancement with a device, such as DVP 19, that can do other kinds of image processing required in connection with digital subtraction fluorography is preferred. Thus, a suitable digital video processor is described in Andrews et al U.S. Pat. No. 4,449,195 the entire disclosure of which is incorporated herein by reference. The patent is assigned to the assignee of this application for patent.

The typical DVP includes several electronic components such as at least two full frame digital memories, and arithmetic logic unit (ALU), multiplexers, registers and multipliers which are interconnected by data buses, and input buses for raw or reprocessed images and an output line for image signals leading to a television monitor on which a fluorographic image is viewed. A controller or digital video processor central processor unit (DVP-CPU) 27 provides control data to the various components of the DVP to activate or deactivate them for an image processing step or steps which, in effect, means that the data paths, data sources and data destinations are addressed and controlled by instructions or signals provided by the DVP-CPU. Thus, the DVP can be adapted within television frame rates to do such operations as adding and subtracting digital images, or shifting an image relative. The DVP can also be controlled to multiply pixel data composing an image by selected coefficients as required for various processing steps.

The fluorographic system diagrammed in FIG. 1 is controlled overall by a host central processor unit (CPU) system controller symbolized by the block 25. A user interface terminal 26 allows the examining radiologist to call up any fluorographic technique required allowing visualization of a particular part of the body such as the carotid arteries as one example. The host CPU 25 sends generalized instructions to the DVP-CPU 27 identifying the image acquisition procedure for the elected type of examination. These instructions are provided over address/data bus 28, I/O interface 29 and bus 30. DVP-CPU 27 accesses a recipe or list of instructions, for executing the examination technique, from read-only memory (ROM) 31 and through I/O interface 32 and bus 33 delivers the proper control words to the registers of the components in the DVP 19 so the components are activated and deactivated at the proper times and the data paths in the DVP are properly routed to ekecute the image acquisition and processing instructions. One process executed by DVP might be to weight the mask image frame and image frame wherein a blood vessel of interest is filled with X-ray opaque medium and to then subtract one image from the other to cancel bone and most soft tissue in the difference image data so that the image of the blood vessel remains. The process performed by the DVP of present interest is filtering the final difference image to enhance its edges.

An X-ray exposure or sequence of exposures is initiated by actuating hand switch 34. The X-ray control circuits 35 respond by bringing about energization of the X-ray power supply 36 for it to turn the X-ray source 11 on and off at the proper times to start and stop individual exposures. The video camera control 37 received timing signals from the DVP clock, not shown, by way of line 38. The time base for the DVP-CPU controller 27 is the vertical blanking pulse rate of the video camera as supplied over line 39.

Theoretically, if a black pixel is adjacent a white pixel in an image and the edge between them is scanned, the resulting electric signal should be like a square wave having a sharp use and fall in the time domain. It is well known that by employing a Fourier transform, a series of harmonics or sine waves having different amplitudes, frequencies and phase relationships and a dc component can be defined which, when summed, will form the square wave. Such transformation demonstrates that a sharp edge or rise in the waveform will be constituted by more high frequency components in the frequency domain than a slowly rising waveform.

For reasons given earlier, the equivalent of a square wave or fast rise time pulse is not produced in the image signal while scanning over an edge that should be sharp but is spread due to the action of the image intensifier input and output phosphors and the image plate or target of the video camera. FIG. 3 can be used to illustrated how the values of the digitized pixels would appear in scan across the horizontal line through a blood vessel which, in the body, does have fairly sharp edges. Assume the blood vessel is filled with an X-ray opaque medium. FIG. 3 shows that the pixel values, representative of image intensities rise gradually when scanning starts at the left edge and then they peak and fall gradually as the right edge is scanned. If the pixel values are a function of location they can also be treated as a function of time, f(t), since scanning rate is constant. So the equation of the plot in FIG. 3 is a function of time.

To generate a new function s(t) which has sharper edges than f(t), one could simply gain or amplify the higher frequency components without changing the low frequency components. A known function $H(j\omega)$ that would do this edge enhancement is the Fourier transform of a filter which is plotted in FIG. 4 where $\omega$ is the frequency. Expressed mathematically $H(j\omega)$ equals 2 for $\omega > \omega_L$ 2 for $\omega < -\omega_L$ 1 elsewhere (Eq.1)

As one can see, a problem with the filter function of FIG. 4 is that it results in enhancing all of the high frequencies. The useful information represented by pixel data on the other hand lies within a relatively narrow frequency range and all higher frequencies are mostly noise. Thus, though higher frequency components at the ends of the range are gained to sharpen the edges, this filter function gains or amplifys all of the noise so signal-to-noise ratio is undesirably low.

The edge enhance filter provided in accordance with the invention changes only the frequencies that are in the frequency range of the useful information containing function.

Attention is invited to FIG. 5. Here a new filter $H(j\omega)$ is represented by the solid line plot of the function versus sampling frequency. According to this function no gain is imparted to frequencies greater than $-\omega_H$ and $\omega_H$ because the greater frequencies result primarily from noise in the system. The low frequency range of $-\omega_L$ to $\omega_L$ are to be given a gain of 1.0. The 1.0 level corresponds to the dc component of the Fourier transform.

If the gain in this region were made greater than 1.0 the pixels would be brighter than normal. The signal frequency components in the ranges of $-\omega_L$ to $-\omega_H$ and $\omega_L$ to $\omega_H$ are to be enhanced since they are the components corresponding to the edges.

Expressed mathematically $H(j\omega)$ equals 2 for $-\omega_H < \omega < -\omega_L$ 2 for $\omega_L < \omega < \omega_H$ 1 for $\omega > \omega_H, \omega < \omega_L$ 1 for $\omega > -\omega_L, \omega < -\omega_H$ (Eq.2)

An alternate representation of $H(j\omega)$ is shown in FIG. 8

Here $H(j\omega)$ equals 1.0 for $-\omega_H < \omega < -\omega_L$ 1.0 for $\omega_L < \omega < \omega_H$ 0.0 for $\omega < \omega_H, \omega < \omega_L, \omega > -\omega_L, \omega < \omega_H$ (Eq.3)

In this case the filtered image will contain frequency components greater than $\omega_L$ and less than $\omega_H$. This will result in an image only where there are edges. To obtain an edge enhanced image, the original image is added to the filtered image.

To implement a filter process, the Fourier transform is found. The result is multiplied by the function, $H(j\omega)$, and the result of this multiplication is inverse Fourier transformed to obtain a filtered image. Alternatively, the time domain function, $d_n$, of the filter can be found using equation 4:

$$d_n = \frac{1}{\omega_s} \int_{-\omega_s/2}^{\omega_s/2} D(j\omega)e^{j\omega nT} \quad \text{(Eq. 4)}$$

where:
$\omega_s$ = sampling frequency
$T = 1/\omega_s$
n = an integer from $-\infty$ to $\infty$
$D(j\omega)$ = frequency response of the filter
$d_n$ = Fourier coefficient.

Now the filtered image or output of the filter $s(nT)$ can be obtained by convolving the input image with the time domain function of the filter represented by $d_n$. The convolution of the two functions is given by the following equation 5:

$$s(nT) = \sum_{k=-r}^{r} d_k f(nT - kT) \quad \text{(Eq. 5)}$$

where:
r = the number of pixel shifts for one operation.
$d_k$ = the filter coefficients.
T = a time delay expressed in terms of a number of pixels.
f(nT−kT) represents the digitized input signal to the filter.

Eq. 5 is a process by which a value s(nT) is derived from f(nT) to obtain the function s(nT) using f(nT) and $d_n$ and Eq. 5 is equivalent to performing the following operations:

Shift f(nT) left r locations, multiply by $d_r$, add f(nT) shifted left r−1 locations multiplied by $d_{r-1}$, add f(nT) shifted left r−2 locations multiplied by $d_{r-2}$. Continue until f(nT) shifted right r locations multiplies by d−r. The result is the filtered image.

In accordance with the invention, formation of s(T) is accomplished by performing a sequence of image data shifts, multiplications and storage steps. This will be explained in reference to FIG. 2. After the explanation, those designing to filter a fluorographic digitized image for obtaining edge enhancement by accenuating the high frequency components in the image signals at the edges of image increments without accentuating high frequency noise should be able to do so on an empirical basis without much attention to underlying theory.

In practice the filtering method is carried out in the DVP 19 which is a versatile digital image processing device. The configuration of the DVP and the components involved in the new filtering method are diagrammed in FIG. 2.

Figure 2:
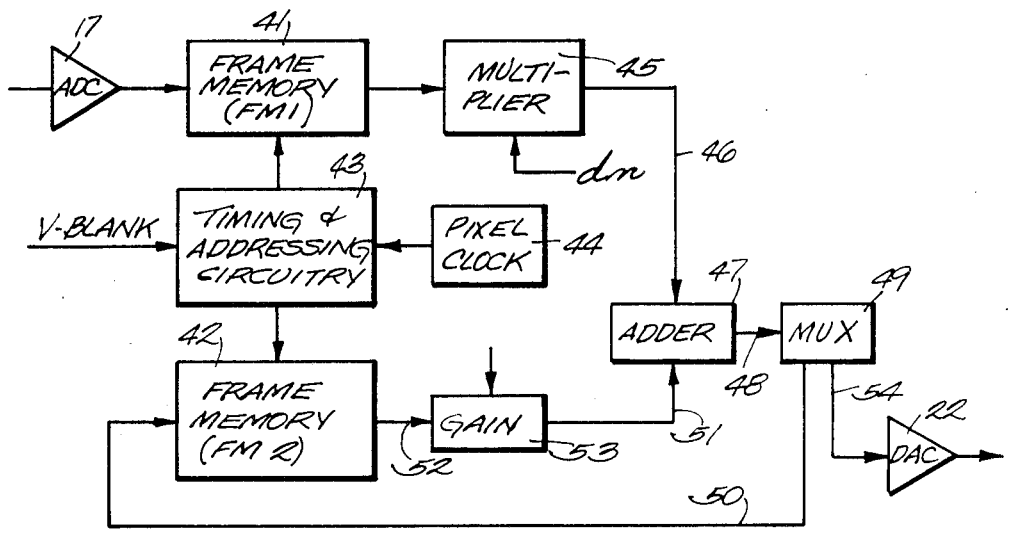
FIG. 2 is a block diagram of those components in the digital video processor of the preceding diagram that are involved in the image enhancement process.

Assume a digitized image that is to undergo edge enhancement is stored in frame memory (FM) 41 in FIG. 2. This could be a single fluorographic image that has been digitized in ADC 17. Assume for the sake of example that the image in FM 1 is a difference image resulting from subtracting a processed mask image from an image of a blood vessel containing region when the vessel is filled with an X-ray opaque medium. By way of example and not limitation the image in FM 1 may have 512 digital pixels in a horizontal line and have 512 horizontal lines. The coefficients, $d_n$, have been calculated for some range of n, such as from n=−5 to 5 and these coefficients are stored. A larger range gives closer approximation to the desired frequency response. In an actual use of the process, "n" ranging from −14 to 14 produced excellent sharpness with background noise eliminated.

The filtered image result of Eq. 5 is obtained with FIG. 2 circuitry.

The filtering cycles carried out in FIG. 2 are each referenced to a vertical blanking signal from the video camera chain as indicated by the v-blank input to the timing and addressing circuitry 43. A pixel clock pulse generator 44 is input to circuitry 43. The pixel clock governs the rate at which pixels in the horizontal lines of pixels are output from FM 41 and corresponds to the sampling frequency ($\omega_s$).

Assume "r" is chosen to range from −5 to the left of the pixel of interest to 5 to the right for the sake of simplifying the example as compared with chosing larger values of "r". "r" is actually a time delay expressed in terms of a number of pixels measured from occurrence of a v-blank pulse.

With the original image in FM 1, the first V-blank pulse occurs to start the filtering process. Timing circuit 43 would start by counting off 5 pixel clocks where n=−5 in this example. After 5 clocks the pixels in the first horizontal line in FM 1 would output to a multiplier 45 where the pixels would each be multiplied by d which would be the $d_n$ value corresponding to "n" and "r" equally −5. This amounts to a left shift of the whole horizontal line of pixels by 5 pixels. Of course, the pixels for line after line 30 come out of FM 1 in a steady stream and each is multiplied by the $d_n$ coefficient for n=−5.

As the lines of pixels are multiplied they are fed by way of a bus 46 to an adder 47 whose output is compled by way of bus to the input of a multiplexer (MUX) 49. The first shifted and multiplied image is delivered from the MUX 49 by way of the bus 50 to full frame memory 42 (FM2) where this image is stored, with the lines shifted.

When the next v-blanking pulse occurs, the delay is for 4 pixels left. The pixels are then multiplied by $d_n$ where n=−4. At this time, the image previously inserted in FM 2 is supplied to input 51 of adder 47 by way of bus 52 and a gain input circuit 53 where the multiplied pixels in the second image cycle are added to the stored image and returned to storage in FM 2 by way of bus 50. The process is repeated and can be represented symbolically as:

$V$-blank (1) [FM1 (shift 5 left) × $d_{n=-5}$ $\xrightarrow{\text{Store}}$ FM2

$V$-blank (2) [FM1 (shift 4 left) × $d_{n=-4}$ + FM2 ⟶ FM2

.
.
.

$V$-blank (5) [FM1 (shift 1 left) × $d_{n=-1}$ + FM2 ⟶ FM2

.
.

$V$-blank (6) [FM1 (shift 1 right) × $d_{n=0}$ + FM2 ⟶ FM2

.
.
.

$V$-blank (11) [FM1 (shift 5 right) × $d_{n=5}$ + FM2 ⟶ FM2

The process thus far enhances one dimensionally since it is only a series of pixels to the left and right of each pixel of interest in a horizontal line that modifies the respective individual center pixel. However, pixels above and below each centered pixel influence each individual pixel so the process is contained as $V$-blank (12) [FM1 (shift 5 up) × $d_{n=5}$ + FM2 $\xrightarrow{\text{Store}}$ FM2

.
.
.

$V$-blank (16) [FM1 (shift 1 up) × $d_{n=1}$ + FM2 ⟶ FM2

.
.

$V$-blank (17) [FM1 (shift 1 down) × $d_{n=0}$ + FM2 ⟶ FM2

.
.
.

$V$-blank (22) [FM1 (shift 5 down) × $d_{n=5}$ + FM2 ⟶ FM2

At the end of the process FM2 contains real numbers that are made up of the mid-band frequency components of the original image. In other words FM2 contains the edges from the original image. If the image data in FM2 were sent through adder 47 unmodified and through MUX 49 to be converted to analog video signals in DAC 22 and displayed, only edges would be visible on video monitor 24.

The contents of FM2 are herein called an edge map. Pixel locations in FM2 will contain integer values where there are changes or edges in the image. This is the result of the cyclic processing described above. The matter can be understood better if a single horizontal line is considered. Refer to FIG. 3. This is a plot of a line of pixel levels across an X-ray opaque medium filled vessel, for example, versus location of the pixels along the line. The pixel values are obviously low at the edges for reasons explained earlier so the edges would not be sharp.

FIG. 6 shows the values or levels of pixels in FM2 in and around the corresponding edges at the far left and far right of the vessel edges in FIG. 3. The values representing the edges in FIG. 6 go alternately negative and positive and are a number of pixels wide in FM2 that depends on the range of "r" that has been chosen to develop pleasing sharpness. These values in FIG. 6 at specific pixel locations along the horizontal line being examined are added to the pixels in corresponding pixel locations in FIG. 3. The result for the one line across the particular vessel in FIG. 3 having the edge map values of FIG. 6 added is depicted in FIG. 3 where one may see that the edges will be sharp because the pixel values across the vessel rise to a peak and fall sharply across the vessel.

This is demonstrative of shifting horizontally but a drawing similar to FIG. 3 could be made to demonstrate a similar effect in the vertical direction.

Thus the last step in the filtering process is to read out the pixels serially for the original image in FM1 and read out the corresponding pixel locations in the edge map contained in FM2 and add corresponding pixel values in adder 47 to produce the digital pixel values representing the edge enhanced image. MUX 49 is switched at this time to transmit the rows of pixels forming the lines in the image, on a line after line basis, to the DAC 22 where digital pixel values are converted to analog video signals to permit display on monitor 24.

The gain circuit 53 in FIG. 2 provides for amplifying the pixel values out of FM2 so that the user is afforded an opportunity to vary the amount of edge enhancement to suit his or her visual preferences.

We claim:

1. A method of enhancing edges in a fluorographic image obtained with a video camera and converted to digitized picture elements (pixels) which contain frequency components corresponding to true image information and higher frequency components corresponding to noise, comprising the steps of:

determining the filter function, $d_n$ in the time domain required for accentuating frequency components corresponding to edges in the image by calculating $$d_n = \frac{1}{\omega_s} \int_{-\frac{\omega_s}{2}}^{\frac{\omega_s}{2}} D(j\omega)e^{j\omega nT} d\omega$$

where:
$\omega_s$ = pixel sampling frequency
$T = 1/\omega_s$
n = an integer from $-\infty$ to $\infty$
$D(j\omega)$ = filter frequency response
$d_n$ = Fourier coefficients to thereby obtain a series of filter coefficients over the integral from $-\omega_s/2$ to $\omega_s/2$, where the "n" selected are finite integral numbers in the range of $-n$ to $+n$ corresponding to the left and right and up and down pixel shifts desired, storing the Fourier coefficients, $d_n$, storing in one full frame memory the digitized image that is to have its edges enhanced, each time a video vertical blanking pulse occurs effecting a time delay corresponding to a number of pixels at said sampling frequency for one of the values of "n" and then reading out the pixel values from said one memory to thereby effectively shift the images readout from said one memory to the left and right and up and down relative to said image stored in said one memory by numbers of pixels through the range of $-n$ to n, and when the first shifted image is read out multiplying it by the coefficient $d_n$ corresponding to the value of "n" by which the image is shifted and storing this image in a second full frame memory, then as each subsequent image is read out multiplying it by a coefficient, $d_n$, corresponding to "n" and adding it to the sum of the previously read out and multiplied images and each time storing the result in said second memory such that when a number of images corresponding to the number of images from $-n$ to n said second memory will contain an edge map image represented by digital pixel values corresponding only to edges, next summing the edge map image from said second memory with said original image from said first memory to thereby enhance the edges in the original image, converting the digital result of said summing to analog video signals and using the analog video signals to drive a video monitor for facilitating visualization of the edge enhanced image.

* * * * *